July 4, 1933.  S. P. NIXDORFF ET AL  1,917,146
REGENERATIVE ELECTRIC REGULATOR
Filed Dec. 16, 1931   2 Sheets-Sheet 1
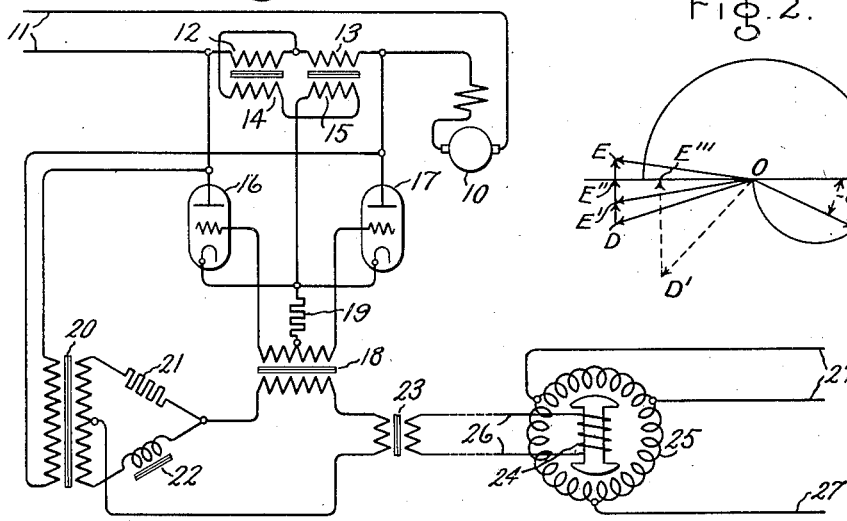
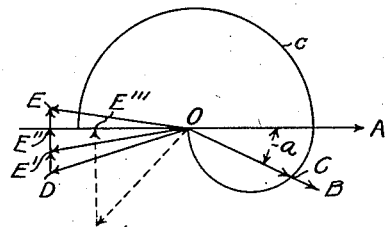
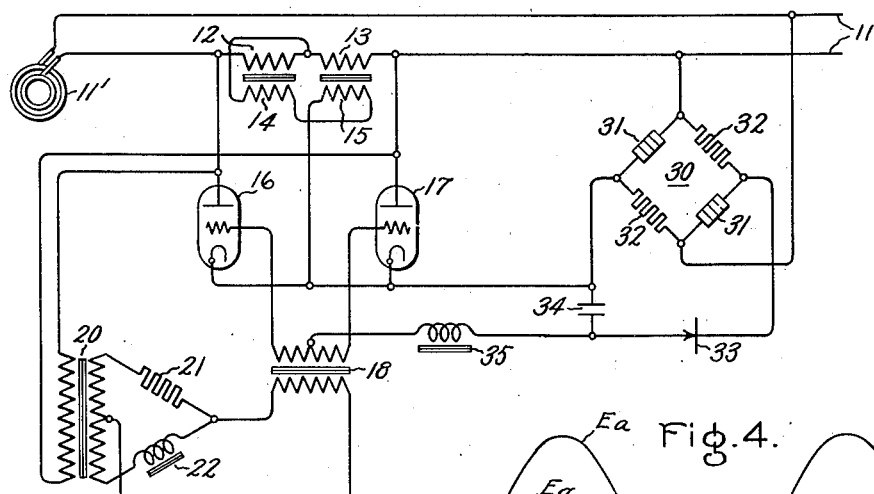
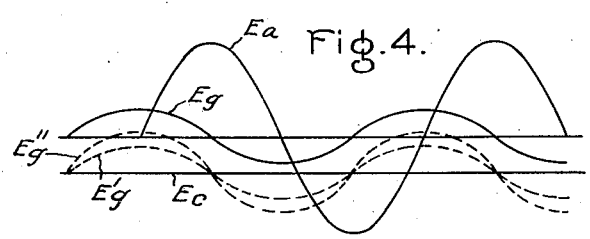
Inventors:
Samuel P. Nixdorff,
Ernst F. W. Alexanderson,
by Charles E. Mullen
Their Attorney.

July 4, 1933. S. P. NIXDORFF ET AL 1,917,146
REGENERATIVE ELECTRIC REGULATOR
Filed Dec. 16, 1931    2 Sheets-Sheet 2
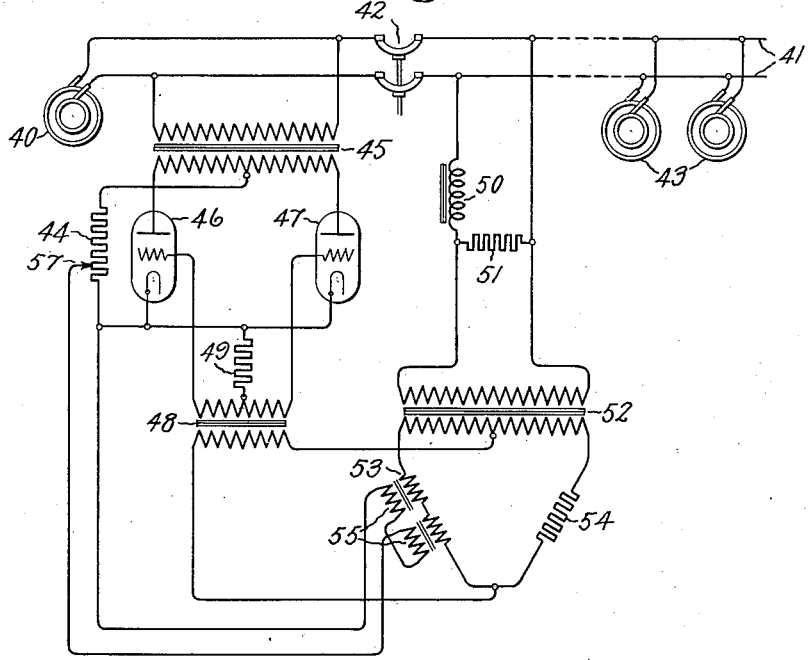
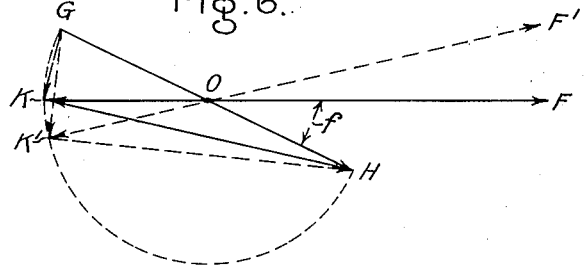
Inventors:
Samuel P. Nixdorff,
Ernst F. W. Alexanderson
by *Charles E. Muller*
Their Attorney.

Patented July 4, 1933

1,917,146

UNITED STATES PATENT OFFICE

SAMUEL P. NIXDORFF AND ERNST F. W. ALEXANDERSON, OF SCHENECTADY, NEW YORK, ASSIGNORS TO GENERAL ELECTRIC COMPANY, A CORPORATION OF NEW YORK

REGENERATIVE ELECTRIC REGULATOR

Application filed December 16, 1931. Serial No. 581,368.

Our invention relates to electric regulating and control circuits and more particularly to such circuits utilizing electric valves for regulating or controlling an electrical condition of a dynamo-electric machine or circuit.

Heretofore there have been devised numerous arrangements including electric valves for controlling and regulating dynamo-electric machines and circuits. Most of these arrangements of the prior art, however, have left something to be desired in the way of rapidity of action and freedom from hunting.

It is an object of our invention to provide an improved regulating and control circuit utilizing electric valves which will overcome the above mentioned disadvantages of the arrangements of the prior art and which will be of general application in the control and regulation of dynamo-electric machines and circuits.

It is a further object of our invention to provide an improved regulating and control circuit utilizing electric valves which is particularly rapid in its action and which will be free from any tendency to hunt.

It is another object of our invention to provide an improved regulating and control circuit utilizing electric valves in which the grids of the electric valves are excited in accordance with the energy transmitted by the valves, and in which this grid excitation is modified in accordance with an electrical condition of the dynamo-electric machine or circuit to be regulated.

In accordance with one embodiment of our invention, a saturable reactor, which is used for regulation or control of a dynamo-electric machine or circuit, is provided with a saturating winding energized through an electric valve, the anode potential of which is determined by the voltage drop across the reactor. The grid circuit of the electric valve is also energized in accordance with the voltage across the reactor and is thus variable in magnitude in accordance with the saturation of the reactor. The grid circuit also includes a component of voltage dependent upon the electrical condition to be regulated. This regulating component is preferably an alternating voltage retarded in phase by more than 90 degrees behind the anode potential of the valve. The two components of grid excitation combine in such a way that when the quadrature leading component of the main grid excitation exceeds the quadrature lagging component of the regulating voltage, the electric valve is fully conducting but under the reverse conditions the valve is fully non-conducting. This arrangement may be modified by substituting a unidirectional potential in place of the regulating alternating potential. With this arrangement the valve is fully conductive when the maximum value of the alternating potential exceeds the unidirectional potential and is fully non-conductive at all other times. With either of these arrangements the apparatus is found to oscillate at a frequency below the frequency of the alternating current supply and dependent upon the constants of the regulating apparatus. Such an arrangement is found to operate extremely rapidly and to avoid any tendency toward hunting.

In accordance with a modification of our invention the saturable reactor, which is saturated in accordance with the output of the electric valve which it is desired to control, is included in the grid control circuit of the electric valve rather than in the power circuit itself. This embodiment of our invention may be applied to an arrangement for maintaining constant the phase displacement between an alternating current generator and an alternating current translating circuit which is normally energized from other sources of alternating current and to which it is desired to supply energy from the alternating current generator and is described and claimed in a copending application of E. F. W. Alexanderson, P. L. Alger and S. P. Nixdorff, Serial No. 581,367, filed December 16, 1931, and assigned to the assignee of the present application. In this arrangement a load device, such, for example, as a resistance, is connected across the alternating current generator through a pair of electric valves. The grids of the electric valves are energized from an impedance phase shifting circuit connected to the system with which it is desired to synchronize the generator. One of the elements of the impedance phase shifting circuit comprises a saturable reactor which is saturated in accordance with the energy delivered to the load device. The phase relation of the potential supplied to the phase shifting circuit is so adjusted that the potential applied to the grids of the electric valves oscillates about the 180° point and the system as a whole oscillates at its own frequency to maintain a fixed phase relation between the machine and the alternating current system.

For a better understanding of our invention, together with other and further objects thereof, reference is had to the following description taken in connection with the accompanying drawings and its scope will be pointed out in the appended claims. Fig. 1 of the accompanying drawings illustrates our invention as applied to an arrangement for remotely controlling the operation of an alternating current motor; Fig. 2 is a diagram to aid in the understanding of the arrangement illustrated in Fig. 1; Fig. 3 shows an arrangement utilizing our invention for maintaining constant the voltage of an alternating current circuit; Fig. 4 is a diagram to aid in the understanding of the arrangement shown in Fig. 3; Fig. 5 illustrates an embodiment of our invention in a system for maintaining a predetermined phase relation between an alternating current generator and an alternating current translating circuit, while Fig. 6 is a diagram to aid in the explanation of the operation of the arrangement of Fig. 5.

Referring now to Fig. 1, there is shown an apparatus for remotely controlling the starting, stopping, or speed of an alternating current motor 10 energized from an alternating current circuit 11. This apparatus includes saturable reactors 12 and 13, or a single saturable reactor provided with an electrical midpoint, connected in series with the alternating current motor 10. The reactors 12 and 13 are provided with saturating windings 14 and 15, respectively, which comprise the load circuit of a rectifying arrangement including electric valves 16 and 17 energized by the voltage appearing across reactors 12 and 13. The valves 16 and 17 are each provided with an anode, a cathode and a control grid and are preferably of the discontinuous control type, such for example, as vapor electric discharge valves. By the term discontinuous control electric valve I refer to that type of valve in which the starting of current in a valve is determined by the potential upon its control grid, but in which the current flowing through the valve may be interrupted only by reducing its anode potential below the critical value. The grids of electric valves 16 and 17 are connected to their common cathode circuit through opposite halves of the secondary winding of a grid transformer 18 and a current limiting resistor 19. The primary winding of the grid transformer 18 is energized with a component of potential derived from an impedance phase shifting circuit comprising a transformer 20, a resistor 21 and a reactor 22, the primary winding of the transformer 20 being energized with the potential across reactors 12 and 13. The constants and connections of this phase shifting circuit are so chosen that the potential impressed upon the primary winding of the grid transformer 18 leads the anode potentials of electric valves 16 and 17 by substantially 90 electrical degrees. The grid transformer 18 is also energized with a component of potential supplied by a transformer 23, the primary winding of which is energized from a secondary member 24 of a rotary phase shifting transformer 25, which may be located at any suitable place, such as a remote control station, in which case the transformer 23 will be interconnected with the secondary member 24 by means of a pilot line 26. The rotary phase shifting transformer 25 may be energized from any suitable source of polyphase power which is synchronized with the alternating current circuit 11, such for example as a three-phase circuit 27.

The operation of the above described apparatus will be understood more clearly by reference to Fig. 2 in which the vector OA represents the voltage applied to the anodes of the pair of electric valves connected in the conventional manner to obtain full wave rectification; the vector OB represents a grid potential such as would be applied to the grids of the electric valves if the average output of the rectifiers were to be controlled in the usual way, while the vector OC represents the average output of the rectifier with the grid voltage OB lagging the anode voltage OA by the angle $a$. When the load circuit of the rectifier is highly inductive, as is the case in the various arrangements utilized in this invention, the average power output of the rectifier will be reduced to zero when the grid potential is retarded by substantially 90 electrical degrees. The curve $c$ represents the polar diagram of the average output of such a rectifying apparatus for various phase angles of the grid potential. It will be noted that for any angle of lead of the grid potential the output of the rectifying arrangement will remain constant at its maximum value, while for values of this phase angle between 90 degrees lagging and 180 degrees lagging the average output of the rectifier is zero. As stated above, according to my invention, the grids of the valves 16 and 17 are excited with a component of potential derived from a phase shifting circuit energized in accordance with the potential across the reactors 12 and 13. This potential is shifted to lead the anode potentials of the valves by substantially 90 electrical degrees and will be variable in magnitude in accordance with the potential appearing across the reactors 12 and 13. It will be assumed that the magnitude of the component of potential supplied by the transformer 23, will be slightly greater than the maximum value of the potential derived from the impedance phase shifting circuit, so that when the potential supplied by the transformer 23, which will hereinafter be called the control potential, is shifted to lag the anode potential by substantially 90 degrees, the resultant grid potential will lag the anode potential by approximately 90 electrical degrees. Under this condition, the average output of rectifier arrangement including the valves 16 and 17, and hence the saturation of the windings 14 and 15, will be substantially zero. It will be assumed that initially, the control potential has been shifted to lag the anode potential OA by substantially 90 electrical degrees and that the reactance of reactors 12 and 13 when completely unsaturated is sufficient to absorb practically all of the voltage of the alternating current circuit 11 so that the motor 10 will not start. Assume now that the control potential be still further retarded in phase until it is represented by the vector OD of Fig. 2. The potential derived from the impedance phase shifting circuit in this case will be represented by the vector DE so that the resultant potential applied to the grids 16 and 17 will be indicated by the vector OE. Under this condition the valves 16 and 17 are fully conductive and the windings 14 and 15 become energized to saturate the reactors 12 and 13. As these reactors become saturated, their impedance decreases substantially, allowing the alternating current motor to start. Simultaneously the potential drop across the reactors 12 and 13 is decreased and, since this is the potential applied to the anodes of the valves 16 and 17, the energization of the saturating windings 14 and 15 will also be decreased. Since the grid potential is also derived from this same potential drop across reactors 12 and 13, it will be correspondingly decreased and may now be represented by the vector DE'. The resultant grid potential OE' now lags the anode potential OA by substantially 180 electrical degrees, so that the valves 16 and 17 are rendered completely non-conductive and the saturating current of the windings 14 and 15 is interrupted. The impedance of the reactors 12 and 13 now increases rapidly and with it the magnitude of the grid potential until it is again represented by the vector DE. The points E and E' have been somewhat exaggerated for the sake of clarity. Actually they will very closely coincide with the point E''. The above described cycle will be repeated indefinitely, the potential across the reactors 12 and 13 being maintained at an average value corresponding to an average value of the grid potential DE''. Obviously, by advancing the phase of the control potential to the position OD' the average value of the potential across reactors 12 and 13 may be maintained at a value corresponding to an average grid potential D'E'''. The potential applied to alternating current motor 10 is the difference between the supply potential and that consumed across the reactors 12 and 13. By properly adjusting the phase relation of the control potential, the voltage consumed across reactors 12 and 13 may be varied and the alternating current motor may be stopped, started or maintained at any predetermined speed. The frequency of oscillation of the circuit including the saturable reactors 12 and 13 and electric valves 16 and 17 may be determined by properly choosing the constants of the reactors 12 and 13, thus making possible a very rapid and accurate control of the alternating current machine 10.

In Fig. 3 there is illustrated a modification of our invention as applied to an arrangement for maintaining constant the voltage of an alternating current circuit. In this arrangement the control potential which is combined with the grid excitation derived from the rectifier circuit is a unidirectional potential. The regenerative oscillating circuit is the same as that described in connection with the arrangement of Fig. 1, while the alternating current circuit is illustrated as being energized from an alternating current generator 11'. There is connected to the alternating current circuit 11 a voltage responsive bridge 30 comprising dissimilar resistance elements 31 and 32, examples of which are well known in the art. The output diagonal of the bridge 30 is connected between the grid transformer 18 and the common cathode circuit of the valves 16 and 17. This circuit includes a unilaterally conductive device, such, for example, as a contact rectifier 33, and an arrangement for filtering out the ripples in the rectified potential comprising a parallel connected capacitor 34 and a series connected reactor 35.

The function of the voltage responsive bridge 30 of the above described apparatus is, as will be well understood by those skilled in the art, to amplify the potential variations of the alternating current circuit 11, these amplified variations appearing across the output diagonal from which the control potential of the valves 16 and 17 is obtained. This amplified alternating potential is transformed by means of the rectifier 33 and the filter comprising capacitor 34 and reactor 35 into a unidirectional potential variable in magnitude in accordance with these amplified variations. The grid potential derived from reactors 12 and 13 is shifted to lead the anode potential substantially 90 electrical degrees as in the arrangement in Fig. 1 and as illustrated in Fig. 4, in which the curve $E_a$ represents the anode potential applied to the valves 16 and 17; the curve $E_g$ indicates the grid potential derived from reactors 12 and 13 advanced 90 electrical degrees ahead of the anode potential, while the straight line $E_c$ represents the unidirectional control potential derived from the voltage responsive bridge 30. The resultant of these component grid potentials is represented by the curve $E'_g$, which, it is seen, is negative throughout the cycle so that the valves 16 and 17 are completely non-conductive. Under this condition, the saturating current of the windings 14 and 15 is interrupted, the impedance of the reactors 12 and 13 rapidly increases thereby decreasing the voltage of the alternating current circuit 11. The immediate result is to increase the grid voltage to the value represented by the curve $E''_g$, at the same time substantially reducing the control potential $E_c$ derived from the voltage responsive bridge 30. These two effects combine to raise the resultant grid voltage to such a value as to render the valves 16 and 17 conductive at the beginning of their respective positive half cycles of anode potential so that they are fully conductive. As in the arrangement described in connection with Fig. 1, this regulating circuit will oscillate at a frequency dependent upon its constants and will thus maintain very accurate regulation of the voltage of the circuit 11 at the value corresponding to the normal voltage of the bridge 30 even under extreme load fluctuations. The voltage which it is desired to regulate may be determined by the constants of the bridge 30, the magnitude of the grid potential $E_g$, or both.

In Fig. 5 there is shown a further modification of our invention as applied to an arrangement for maintaining a predetermined phase relation between an alternating current generator and an alternating current translating circuit to which it is normally adapted to supply energy as described and claimed in our above identified joint application with P. L. Alger. In this arrangement an alternating current generator 40 is connected to supply energy to an electric translating circuit 41 through disconnecting means shown as a circuit breaker 42. The alternating current circuit 41 is also energized from generators 43 or from any other suitable source. In case the load should be removed suddenly from the system or in case the disconnecting means 42 should be opened in response to a fault in the feeder circuit, or to any other causes, the alternating current generator 40 will tend to speed up so that its potential will be advanced in phase with respect to that of the alternating current circuit 41. In order to keep the generator 40 in synchronism with the circuit 41 means are provided for maintaining a predetermined phase relation between the voltage of the machine 40 and that of the circuit 41. In order to regulate the average speed of the alternator 40, and hence the phase relation of its terminal voltage, there is provided an arrangement for loading it. This arrangement comprises a load device shown as a resistor 44, a transformer 45 and a pair of electric valves 46 and 47 connected in the conventional manner for obtaining full wave rectification. The valves 46 and 47 are each provided with an anode, a cathode and a control grid and are preferably of the vapor electric discharge type. The grids of the valves 46 and 47 are connected to their common cathode circuit through opposite halves of the secondary winding of a grid transformer 48 and a current limiting resistor 49. In order to control the average loading of the alternator 40, we have provided in accordance with the present invention a grid excitation circuit which furnishes a grid potential oscillating about the 180° point as in the arrangements shown in Figs. 1 and 3, thus periodically loading the generator 40 directly on the resistor 44. The relative duration of the intervals during which the generator is loaded and those during which it is not loaded determines the average load on the generator and hence the average phase relation of the generator potential. The oscillating grid excitation circuit includes a source of control potential which in the illustrated embodiment is derived from the alternating current circuit 41 through a phase advancing arrangement illustrated as a serially connected reactor 50 and resistor 51. The potential across the resistor is impressed upon an impedance phase shifting circuit including a transformer 52, the primary winding of which is connected across the resistor 51 and across the secondary winding of which are connected a saturable reactor 53 and a resistor 54. The primary winding of grid transformer 48 is connected between the electrical midpoint of the secondary winding of transformer 52 and the junction between reactor 53 and resistor 54. Reactor 53 is provided with saturating windings 55 which are energized from a portion of the potential across resistor 44, as, for example, by connecting them across a variable portion of this resistor through an adjustable connection 57. The windings 55 are, therefore, energized in accordance with the current delivered to resistor 44. The saturating windings 55 are so connected that no alternating current will be induced in them, as will be well understood by those skilled in the art.

The general principles of operation of the above described rectifier arrangement and the associated load device 44 in regulating the average phase relation of the potential of the generator 40 will be well understood by those skilled in the art. In brief, if the generator 40 is delivering a given load to the circuit 41 and the circuit breaker 42 opens, due to a fault on the feeder circuit or for any other cause, the sudden removal of the load from the machine 40 will cause it to tend to speed up. However, if, at the same instant, an average load be thrown on the generator 40 by means of the rectifier arrangement equal to that which has been disconnected by means of a circuit breaker 42, the phase relation of the potential of the generator 40 will not be disturbed. Similarly, if the average load on the machine 40 due to the rectifier arrangement and the load device 44 is varied in equal and opposite amounts to any sudden or gradual change of load drawn from the generator 40 by the alternating current circuit 41, the phase relation of the potential of the generator 40 may be maintained in a predetermined relation with respect to that of the circuit 41.

The manner in which the above described oscillating grid circuit operates to cause the load drawn by the rectifier arrangement to vary equally and oppositely with that of the changes of load drawn from the generator 40 by the circuit 41 and thus maintain a predetermined phase relationship between the potentials of the generator and the circuit will be best understood by reference to the vector diagram shown in Fig. 6. Assuming the circuit breaker 42 to be closed and the system to be in a state of equilibrium, the vector OF of Fig. 6 represents the anode potential of the electric valves 46 and 47 which, under these conditions, is also the potential of the alternating current circuit 41. The vector GH represents the voltage impressed upon the transformer 52 from the resistor 51. This potential is retarded with respect to that of the circuit 41 by the angle f. Under these conditions it will be assumed that no power is being transmitted through the rectifier arrangement to the load device 44 so that the saturating windings 55 will be deenergized. Under these conditions, the impedance of the reactor 53 will be a maximum and the potential across it will be represented by the vector KH, while the vector GK will represent the potential across the resistor 54 and the vector OK will represent the potential applied to the grids of the valves 46 and 47 which, it is seen, is in direct phase opposition to the anode potential of these valves; i. e., the valves 46 and 47 are maintained non-conductive. In case the load is suddenly removed from the generator 40, as by opening the circuit breaker 42 or any other cause, the generator 40 will tend to speed up and its terminal potential will tend to advance to the position OF'. Under this new condition, it is seen that the grid potential OK is advanced less than 180° beyond the anode potential OF' so that the valves 46 and 47 are fully conductive and the load 44 is thrown directly on the generator 40. This sudden load on the generator 40 tends to slow it down and bring the terminal potential OF' back into phase with the potential OF of circuit 41. At the same time the potential across the resistor 44 energizes the saturating windings 55, the reactor 53 tends to become saturated, and its impedance decreases correspondingly. As the impedance of reactor 53 decreases, the potential drop across it also decreases and may be represented at a given instant by the vector K'H. The grid potential of the valves 46 and 47 is thus advanced to correspond with the vector OK' which, it is seen, is in phase opposition to the anode potential of the valves 46 and 47 represented by the vector OF'. As the reactor 53 tends to become saturated beyond this point, it is seen that the valves 46 and 47 become completely non-conductive so the resistance load 44 is removed from the generator 40. When the current through the resistor 44 is interrupted, the saturating windings 55 are deenergized so that the saturation of the reactor 53 decreases, retarding the grid potential of electric valves 46 and 47 until the grid potential OK is advanced less than 180° with respect to the anode potential OF of the valves 46 and 47 and the resistance load 44 is again connected to the generator 40. In this way the grid potential is oscillated about the 180° point at a frequency which is dependent primarily upon the constants of reactor 53 and the generator 40. It will be apparent that the average phase relation between the vector OF', corresponding to the potential of the generator 40, and the vector OF, which corresponds to the potential of the circuit 41, will be determined by the average value of the vector KH, that is, by the potential across reactor 53, which, in turn, will be determined by its saturation derived from the resistor 44. By properly adjusting the variable connection 57, any predetermined phase relation may be maintained between the potential of the machine 40 and that of the circuit 41.

Although we have illustrated our invention as applied to single-phase systems for the sake of simplicity, it will be obvious to those skilled in the art that it may be extended to any polyphase system without departing from our invention, and that, while we have illustrated only three applications of our invention, it is of general application in any case where it is desired to control or regulate a dynamo-electric machine or circuit by means of a device having characteristics similar to a saturable reactor.

While we have described what we at present consider the preferred embodiments of our invention, it will be obvious to those skilled in the art that various changes and modifications may be made without departing from our invention and we, therefore, aim in the appended claims to cover all such changes and modifications as fall within the true spirit and scope of our invention.

What we claim as new and desire to secure by Letters Patent of the United States, is:

1. An electric translating circuit comprising a source of alternating current, a load device, a discontinuous control electric valve for transmitting energy from said source to said load device, a source of control potential for said valve, and means variable in accordance with the current transmitted through said valve for modifying the action of said control potential to render said valve alternately completely conductive and nonconductive whereby a regenerative oscillation is induced in said translating circuit of a frequency dependent upon the constants of said circuit and said load device.

2. An electric translating circuit comprising a source of alternating current, a saturable reactor provided with a saturating winding, a load circuit including said saturating winding, means for transmitting energy from said source to said load circuit including a discontinuous control electric valve provided with a control grid, a source of control potential for said grid, and means variable in accordance with the current transmitted through said valve for modifying the action of said control potential to render said valve alternately completely conductive and nonconductive whereby said translating circuit is set into a regenerative oscillation of a frequency dependent upon the constants of said circuit and said load device.

3. An electric translating circuit comprising a source of alternating current, a load device, means for transmitting energy from said source to said load device including a discontinuous control electric valve provided with a control grid, a source of control potential for said grid normally tending to render said valve fully conductive, and means responsive to the current through said valve for modifying said control potential to render said valve nonconductive whereby said translating circuit is set into a regenerative oscillation of a frequency dependent upon the constants of said circuit and said load device.

4. An electric translating circuit comprising a source of alternating current, a load device, a discontinuous control electric valve for transmitting energy from said source to said load device, a source of control potential for said valve variable in magnitude in accordance with the current transmitted therethrough and shifted in phase to lead the anode potential by substantially 90 degrees, and a second source of control potential for said valve cooperating with said first control potential to vary periodically the conductivity of said valve substantially instantaneously between its maximum and minimum values, whereby a regenerative oscillation is induced in said translating circuit of a frequency dependent upon the constants of said circuit and said load device.

5. An electric translating circuit comprising a source of alternating current, a load device, a discontinuous control electric valve for transmitting energy from said source to said load device, a source of control potential for said valve variable in accordance with the current transmitted therethrough and tending to render said valve conductive at the initial point of its positive half-cycle of anode potential, and a second source of control potential for said valve opposing the action of said first potential at said initial point to render said valve alternately completely conductive and nonconductive and to maintain the average value of the current transmitted through said valve dependent upon said second control potential.

6. In combination, a source of alternating current, an alternating current circuit including a saturable reactor provided with a saturating winding, means for energizing said winding from said circuit including a discontinuous control electric valve, and a control circuit for said valve including a control potential variable in accordance with the potential across said reactor and a second second potential cooperating with said first potential to render said valve alternately conductive and nonconductive, whereby a regenerative oscillation is induced in said translating circuit.

7. In combination, a source of alternating current, an alternating current circuit including a saturable reactor provided with a saturating winding, means for energizing said winding in accordance with the potential across said reactor including a discontinuous control electric valve provided with a control grid, and an excitation circuit for said grid including a potential variable in accordance with the potential across said reactor and a control potential cooperating therewith to render said valve alternately conductive and nonconductive in accordance with variations in the potential across said reactor.

8. In combination, a source of alternating current, an alternating current circuit including a saturable reactor provided with a saturating winding, means for energizing said winding in accordance with the potential across said reactor including a discontinuous control electric valve provided with a control grid, an impedance phase shifting circuit also energized in accordance with the potential across said reactor and an excitation circuit for said grid including a potential derived from said phase shifting circuit and a control potential cooperating therewith to render said valve alternately conductive and nonconductive in accordance with variations in the potential across said reactor.

9. In combination, a source of alternating current, an alternating current circuit including a saturable reactor provided with a saturating winding, means for energizing said winding from said circuit including a discontinuous control electric valve provided with a control grid, and an excitation circuit for said grid including a potential variable in magnitude in accordance with the potential across said reactor and advanced in phase with respect to the anode potential of said valve by approximately 90 degrees and an alternating control potential variable in phase to render said valve alternately conductive and nonconductive and thus control the average value of the potential across said reactor.

10. An electric translating circuit comprising a source of alternating current, an electric motor, control means interposed between said source and said motor comprising a saturable reactor provided with a saturating winding, means for energizing said winding in accordance with the potential across said reactor including a discontinuous control electric valve provided with a control grid, an impedance phase shifting circuit also energized in accordance with the potential across said reactor, and an excitation circuit for said grid including a potential derived from said phase shifting circuit and leading the anode potential of said valve by approximately 90 degrees and a control potential variable in phase to render said valve alternately conductive and nonconductive and thus control the speed of said motor.

11. In a system of regulation, an alternating current supply circuit, a load circuit, regulating means interconnecting said circuits comprising a saturable reactor provided with a saturating winding, means for energizing said winding from said supply circuit including a discontinuous control electric valve provided with a control grid, and an excitation circuit for said grid including a potential variable in magnitude in accordance with the potential across said reactor and advanced in phase with respect to the anode potential of said valve by approximately 90 degrees and a unidirectional potential variable in magnitude in accordance with variations of the potential of said load circuit from normal.

12. In a system of regulation, an alternating current supply circuit, a load circuit, regulating means interconnecting said circuits comprising a saturable reactor provided with a saturating winding, means for energizing said winding in accordance with the potential across said reactor, a discontinuous control electric valve provided with a control grid, an impedance phase shifting circuit also energized in accordance with the potential across said reactor, and an excitation circuit for said grid including a potential derived from said phase shifting circuit and leading the anode potential of said valve by approximately 90 degrees and a unidirectional control potential variable in magnitude in accordance with variations of the potential of said load circuit from normal.

13. An electric translating system comprising an alternating current generator, a load device, means for interconnecting said generator and said load device including a discontinuous control electric valve provided with a control grid, a source of control potential, an impedance phase shifting circuit energized from said source of control potential and including a saturable reactor, a circuit for exciting said grid from said phase shifting circuit, and means for varying the saturation of said reactor in accordance with the current transmitted to said load device whereby the phase angle of the grid potential with respect to the generator potential is oscillated about the 180° point.

14. An electric translating system comprising an alternating current generator, a load device, means for interconnecting said generator and said load device including a discontinuous control electric valve provided with a control grid, a phase advancing impedance, a source of control potential, an impedance phase shifting circuit connected to said source of control potential through said phase advancing impedance and including a saturable reactor, means for impressing upon the grid of said valve a potential derived from said phase shifting circuit and normally advanced in phase with respect to the potential of said generator by slightly less than 180°, and means for varying the saturation of said reactor in accordance with the current transmitted to said load device to advance said grid potential by more than 180° whereby a regenerative oscillation is set up in said system of a frequency dependent upon its constants.

In witness whereof, we have hereunto set our hands.

ERNST F. W. ALEXANDERSON.
SAMUEL P. NIXDORFF.

CERTIFICATE OF CORRECTION.

Patent No. 1,917,146.  July 4, 1933.

SAMUEL P. NIXDORFF, ET AL.

It is hereby certified that error appears in the printed specification of the above numbered patent requiring correction as follows: Page 6, line 102, claim 6, for "second" read "control"; and that the said Letters Patent should be read with this correction therein that the same may conform to the record of the case in the Patent Office.

Signed and sealed this 22nd day of August, A. D. 1933.

M. J. Moore.

(Seal)  Acting Commissioner of Patents.